Nov. 1, 1932.  W. J. GAGNON  1,886,176
METHOD OF AND APPARATUS FOR MOLDING PINS IN RADIO TUBE BASES
Filed June 28, 1927

Inventor:
WILLIAM J. GAGNON
By his Attorneys

Patented Nov. 1, 1932

1,886,176

UNITED STATES PATENT OFFICE

WILLIAM J. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT

METHOD OF AND APPARATUS FOR MOLDING PINS IN RADIO TUBE BASES

Application filed June 28, 1927. Serial No. 202,082.

My invention relates to an improved insulating base with molded-in contacts and to improved method and apparatus for manufacturing the same. It is particularly applicable to audion bases having tubular sheet metal contact pins molded therein.

My invention not only provides a novel product which is made from more economical, though efficient, material, but also includes novel apparatus and method by which the article may be produced more expeditiously and economically than hitherto.

In the accompanying drawing—

In the manufacture of audion bases it has been the common practice to "stake" the contact pins in holes formed in the molded base material, such as a phenolic condensation product. A heavy loss from breakage results. This led to the molding of the contact pins in the base during the shaping of the latter. The pins heretofore used for this purpose, however, have been formed from rod or bar stock, and have been either solid throughout their length, or counter-bored only in the shank area. In either case, when the base has been molded on the pins, there has been no attempt to simultaneously open a wireway through the base and pin—and in fact the pins used have been of such character that an operation of this sort is impracticable. It has been the practice consequently, to perform a further operation upon the parts in a drilling machine, where, by means of multiple drills, the several wireways are drilled in the base and pins, either throughout the length of the latter or through the heads only, if the pins have been previously counter-bored in their shanks. Two operations thus have been necessary; first, molding the pins in the base, second, boring the base and the pins to form wireways. Two machines and their operations have been required.

My invention not only makes possible the use of a cheaper base material, such as glass, but also eliminates the drilling operation and the expensive multiple drill machine and additional operative. It is of course applicable to a phenolic condensation product if the expense of this material is not objectionable.

Figure 1:
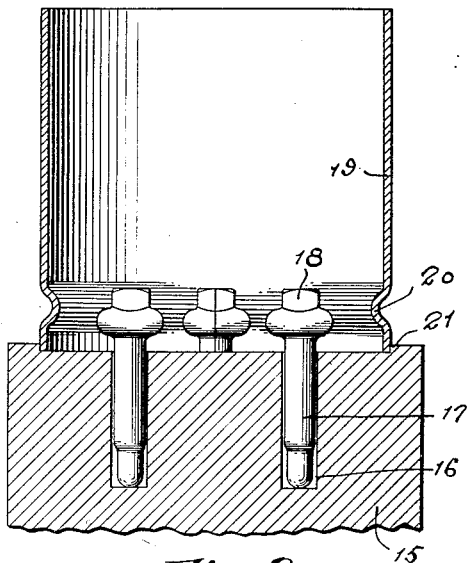
Fig. 1 is a vertical section through a mold showing tubular sheet metal contact pins in position for embedding in the base material.
Figure 2:
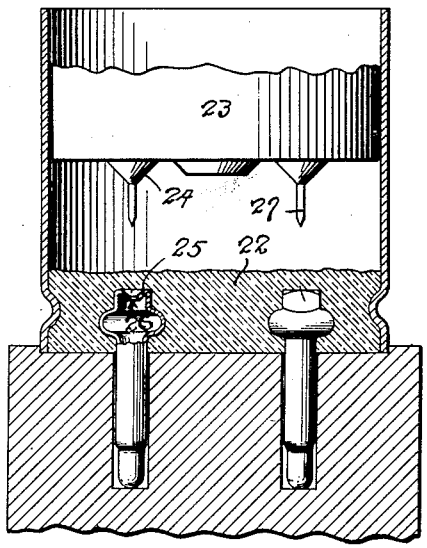
Fig. 2 is a similar view showing the contact heads embedded in unshaped base material and a plunger die descending to shape the base.
Figure 3:
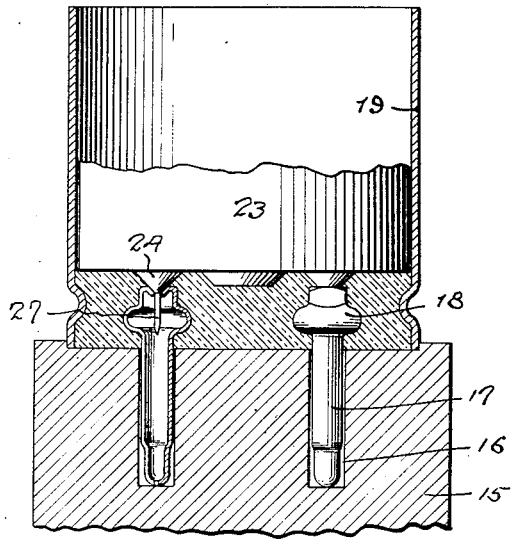
Fig. 3 is a similar view showing the plunger die in base-shaping position.

Referring to the drawing, I have indicated in Fig. 1 a mold 15 provided in its face with several recesses 16 which form wells to accommodate the shanks 17 of tubular sheet metal contact pins which may be of the construction claimed in my copending application above mentioned. The heads 18 of the contact pins stand above the face of the mold in position to be embedded in the base material. A metal shell 19, with annular offset 20, is positioned on the face of the mold, its location being defined by the flange 21. It forms not only the element by which the base material is laterally confined during the molding operation, but also the permanent support for the base and for the audion bulb (not shown) in the finished product.

The parts having been positioned as indicated in Fig. 1, the unshaped base material 22, which may be molten glass, is introduced into the mold chamber constituted by the shell 19 and mold 15. A plunger die 23 now descends to shape the base. The lower face of the plunger is provided with suitably shaped, for example conical, bosses 24, coaxial with the wells 16 in the mold 15. It will be noted that the heads of the pins are obstructed by integral cross webs 25 which serve to exclude the base material from the interior of the pin. When this material is glass it is practicable to preform in the web 25 a central hole 26, and to introvert the web to form a re-entrant annular end flange, since the character of the base material and its plasticity is such that it does not pass through a hole 26 of restricted diameter, so long as it is not subjected to pressure—that is to say when the molten glass is merely flowed into the mold. For cooperation with a pin having an apertured cross web of this type, I provide the plunger bosses 24 with pin-like extensions 27 substantially corresponding in diameter to the holes 26 in the webs 25. These extensions 27 enter and seal the holes 26 in the pin heads in advance of the application of pressure to the hot and more or less mobile base material, and thus exclude the latter from the interior of the pin during the period of pressure exerted by the plunger 23. The conical bosses 24 entering the conical recesses afforded by the introverted webs 25 of the pin heads, clear the latter of the base material and at the same time form flared guideways leading to the holes 26, which open to the interior of the pin.

Figure 4:
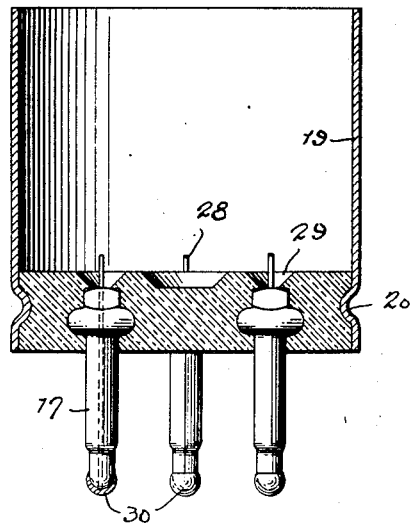
Fig. 4 is a similar view showing the improved product with contact pins embedded in the base and lead wires connected to the pins.

When the base material is sufficiently set the plunger 23 is lifted from the shell 19 and the latter, with the molded base and embedded contact pins, may be lifted from the mold 15 in the form shown in Fig. 4, and in readiness to receive the lead wires 28. The latter may be readily inserted into the hollow pins through the flared guideways 29 formed by the bosses 24 of the plunger 23, and electrically connected to the pins at their free ends by solder 30.

Thus, in the single operation of shaping the more or less fluid base material, not only are the contact pins embedded therein, but wireways are opened to the interiors thereof. The initial cost of a sheet metal pin is materially less than that of a pin formed from bar or rod stock, while the simultaneous embedding of the pin head in the base material and opening of the wireway to the interior of the pin, constitutes a marked economy of labor and expedition of operation over practices heretofore followed. Of course a plunger die is a far simpler and cheaper tool to construct and operate than a multiple drill, and the latter, it will be borne in mind, has hitherto supplemented the mold which shapes the base and embeds the pin heads therein.

The economies of my invention may be secured when using other base material than glass, and with sheet metal pins of other shapes than that disclosed. The particular construction of contact pin above described is not claimed herein, as it forms the subject of my patent application Ser. No. 56,292, filed September 14, 1925. With the understanding therefore that the details illustrated are but indications of the underlying thoughts which I claim as my invention, I claim—

1. The method of forming a contact carrying base, which comprises molding the head of a tubular contact pin in the base material while shaping the latter under pressure, and opening a wireway to the interior of the pin.

2. The method of forming a contact carrying base, which comprises compressing the base material, while plastic, upon the head of a tubular sheet metal pin having an end cross web, and simultaneously opening a wireway to the interior of the pin through the cross web of the pin head.

3. The method of molding a contact pin into an insulating base, which comprises shaping by pressure the base material, while mobile, upon the head of a tubular sheet metal contact pin and simultaneously opening a wireway to the interior of the pin.

4. The method of molding a contact pin into an insulating base which comprises shaping by pressure, hot, plastic base material around the head of a tubular sheet metal contact pin having an end cross web, and simultaneously opening a wireway to the interior of the pin.

5. The method of molding a contact pin into an insulating base, which comprises supporting the head of a tubular sheet metal pin in a molding chamber, introducing unshaped base material into the chamber, and simultaneously shaping the base material and embedding the head of the pin therein under pressure and opening a wireway to the interior of the pin incident to the base shaping operation.

6. The method of molding a contact pin into a base, which comprises supporting the head of a tubular sheet metal contact pin in a mold chamber, introducing unshaped base material into the chamber, and simultaneously shaping said material under pressure upon the pin head and opening a wireway to the interior of the pin.

7. Apparatus for molding contact pins in an audion base, comprising a mold having recesses for the accommodation of the shanks of a plurality of spaced pins, and adapted to support the heads of said pins above the mold face, in combination with a plunger die cooperating with said mold to embed said pin heads under pressure in interposed base material, said die having on its operating face projections aligned with said recesses and adapted to engage the pin heads to open wireways to the interior of the pins incident to the molding operation.

8. The method of molding a contact pin into an insulating base, which comprises shaping by pressure the base material, while mobile, upon the head of a tubular contact pin, and simultaneously opening a wireway to the interior of the pin.

In testimony whereof I have signed my name to this specification.

WILLIAM J. GAGNON.